(12) United States Patent
Werner

(10) Patent No.: US 7,260,530 B2
(45) Date of Patent: Aug. 21, 2007

(54) ENHANCED GO-BACK FEATURE SYSTEM AND METHOD FOR USE IN A VOICE PORTAL

(75) Inventor: Laura A. Werner, Santa Clara, CA (US)

(73) Assignee: BeVocal, Inc., Mountain View, CA (US)

( * ) Notice: Subject to any disclaimer, the term of this patent is extended or adjusted under 35 U.S.C. 154(b) by 796 days.

(21) Appl. No.: 10/078,188

(22) Filed: Feb. 15, 2002

(65) Prior Publication Data

US 2003/0171925 A1    Sep. 11, 2003

(51) Int. Cl.
G10L 15/02    (2006.01)
G10L 15/04    (2006.01)
G10L 21/06    (2006.01)

(52) U.S. Cl. .................... 704/251; 704/270.1; 704/246

(58) Field of Classification Search ............. 704/270.1, 704/270, 235, 251, 275, 246; 379/67.1; 715/501.1, 715/704, 705.1, 804
See application file for complete search history.

(56) References Cited

U.S. PATENT DOCUMENTS

| | | | |
|---|---|---|---|
| 4,326,101 A | 4/1982 | Sakoe | 179/1 SD |
| 5,029,212 A | 7/1991 | Yoshida | 381/43 |
| 5,363,482 A * | 11/1994 | Victor et al. | 715/804 |
| 5,367,609 A * | 11/1994 | Hopper et al. | 704/278 |
| 6,061,737 A * | 5/2000 | Fite et al. | 709/243 |
| 6,154,767 A * | 11/2000 | Altschuler et al. | 709/203 |
| 6,334,103 B1 * | 12/2001 | Surace et al. | 704/257 |
| 6,560,576 B1 * | 5/2003 | Cohen et al. | 704/270 |
| 6,826,264 B2 * | 11/2004 | Valco et al. | 379/67.1 |
| 2002/0010586 A1 * | 1/2002 | Ito et al. | 704/270.1 |

FOREIGN PATENT DOCUMENTS

| | | |
|---|---|---|
| JP | 2000029494 | 1/2000 |
| WO | 00/41165 | 7/2000 |

* cited by examiner

*Primary Examiner*—Tālivaldis Ivars Šmits
*Assistant Examiner*—Abdelali Serrou
(74) *Attorney, Agent, or Firm*—Zilka-Kotab, PC

(57) ABSTRACT

A system, method and computer program product are provided for transitioning among states during use of a voice browser. Initially, a script is received at a voice browser from a web server utilizing a network. Next, the script is executed utilizing the voice browser. A plurality of states is then automatically tracked during the execution of the script utilizing the voice browser. Upon receiving a request from a user during the execution of the script to transition to a previous state, the voice browser automatically transitions to the previous state of the script.

16 Claims, 7 Drawing Sheets

ENHANCED GO-BACK FEATURE SYSTEM AND METHOD FOR USE IN A VOICE PORTAL

FIELD OF THE INVENTION

The present invention relates to voice portals, and more particularly to transitioning among states in a voice portal.

BACKGROUND OF THE INVENTION

Techniques for accomplishing automatic speech recognition (ASR) are well known. Among known ASR techniques are those that use grammars. A grammar is a representation of the language or phrases expected to be used or spoken in a given context. In one sense, then, ASR grammars typically constrain the speech recognizer to a vocabulary that is a subset of the universe of potentially-spoken words; and grammars may include subgrammars. An ASR grammar rule can then be used to represent the set of "phrases" or combinations of words from one or more grammars or subgrammars that may be expected in a given context. "Grammar" may also refer generally to a statistical language model (where a model represents phrases), such as those used in language understanding systems.

Products and services that utilize some form of automatic speech recognition ("ASR") methodology have been recently introduced commercially. Desirable attributes of complex ASR services that would utilize such ASR technology include high accuracy in recognition; robustness to enable recognition where speakers have differing accents or dialects, and/or in the presence of background noise; ability to handle large vocabularies; and natural language understanding. In order to achieve these attributes for complex ASR services, ASR techniques and engines typically require computer-based systems having significant processing capability in order to achieve the desired speech recognition capability.

In a standard speech recognition/synthesis system, a database of utterances is maintained for administering a predetermined service. In one example of operation, a user may utilize a telecommunication network to communicate utterances to the system. In response to such communication, the utterances are recognized utilizing speech recognition, and processing takes place utilizing the recognized utterances. Thereafter, synthesized speech is outputted in accordance with the processing. In one particular application, a user may verbally communicate a street address to the speech recognition system, and driving directions may be returned utilizing synthesized speech.

In order to facilitate the interaction between the user and a system that is available through the Internet, a specially adapted voice mark-up language (VoiceXML) is employed. VoiceXML allows for the creation of voice dialogs, which are stored on any Web site and referenced by URL just like HTML documents. In use, the user may call a phone number and interact with a VoiceXML application through speech recognition, and (TTS) Text-To-Speech and recorded prompts. To accomplish this, VoiceXML allows a developer to create a script, whereby the user can have a conversation with a script which is stored on the Web site, and executed by a VoiceXML Browser. The user places a call and is connected to a program called a voice browser, or "interpreter". The voice browser may fetch the user's VoiceXML document at a specified URL. The user may interact with the VoiceXML document using speech recognition as it is interpreted by the VoiceXML Browser. The markup defined in VoiceXML is a specific instance of the Extensible Markup Language (XML), the strategic data definition language for the Internet.

Prior art FIG. 1 illustrates a particular example 10 of use of a conventional voice browser showing the manner in which a user may transition among states. As shown, a main menu 12 may be provided in the form of a plurality of prompts each corresponding to one of many states of the particular voice browser. In one example, a news prompt 14, a weather prompt 16, and a traffic prompt 18 may be provided. A user may begin by verbally selecting the news prompt 14 after which he or she may select the weather prompt 16. At this or any other point, the user may verbalize a "go-back" command which prompts the voice browser to return to a previous state. For example, at the weather prompt 16 the go-back command would return the voice browser to the news prompt 14. Of course, the functionality of the go-back command may vary based on the current state. For example, from the traffic prompt 18 the go-back command may carry the user to a city prompt 20 which in turn may verbalize traffic 22 to the user based on the city that is chosen.

One problem with designing such go-back features is the need to specify to which prompt the voice browser must transition at each state. This requirement can be quite cumbersome during the design phase of a voice application.

DISCLOSURE OF THE INVENTION

A system, method and computer program product are provided for transitioning among states during use of a voice browser. Initially, a script is received at a voice browser from a web server utilizing a network. Next, the script is executed utilizing the voice browser. A plurality of states are then automatically tracked during the execution of the script utilizing the voice browser. Upon receiving a request from a user during the execution of the script to transition to a previous state, the voice browser automatically transitions to the previous state of the script.

In one embodiment, it is determined whether code exists indicating that the previous state should be skipped. If so, the voice browser transitions to a state previous to the previous state in response to the request. In use, any state may be tagged as being skipped. Thus, the voice browser transitions to the most recent previous state that is not marked as skipped.

In another embodiment, it is determined whether code exists indicating a state other than the previous state to which the script should be transitioned. If such code exists, the voice browser transitions to the state other than the previous state in response to the request. Optionally, the code may be adapted for identifying specific instructions relating to the manner in which the transitioning is to be carried out.

In still another embodiment, information is stored regarding each state of the script. Optionally, such information may be stored in the form of a stack. Further, the information may identify a type of event associated with one of the states, a field item, a form, an application, and/or a pointer.

BRIEF DESCRIPTION OF THE DRAWINGS

Prior art

DESCRIPTION OF THE PREFERRED EMBODIMENTS

Figure 1:
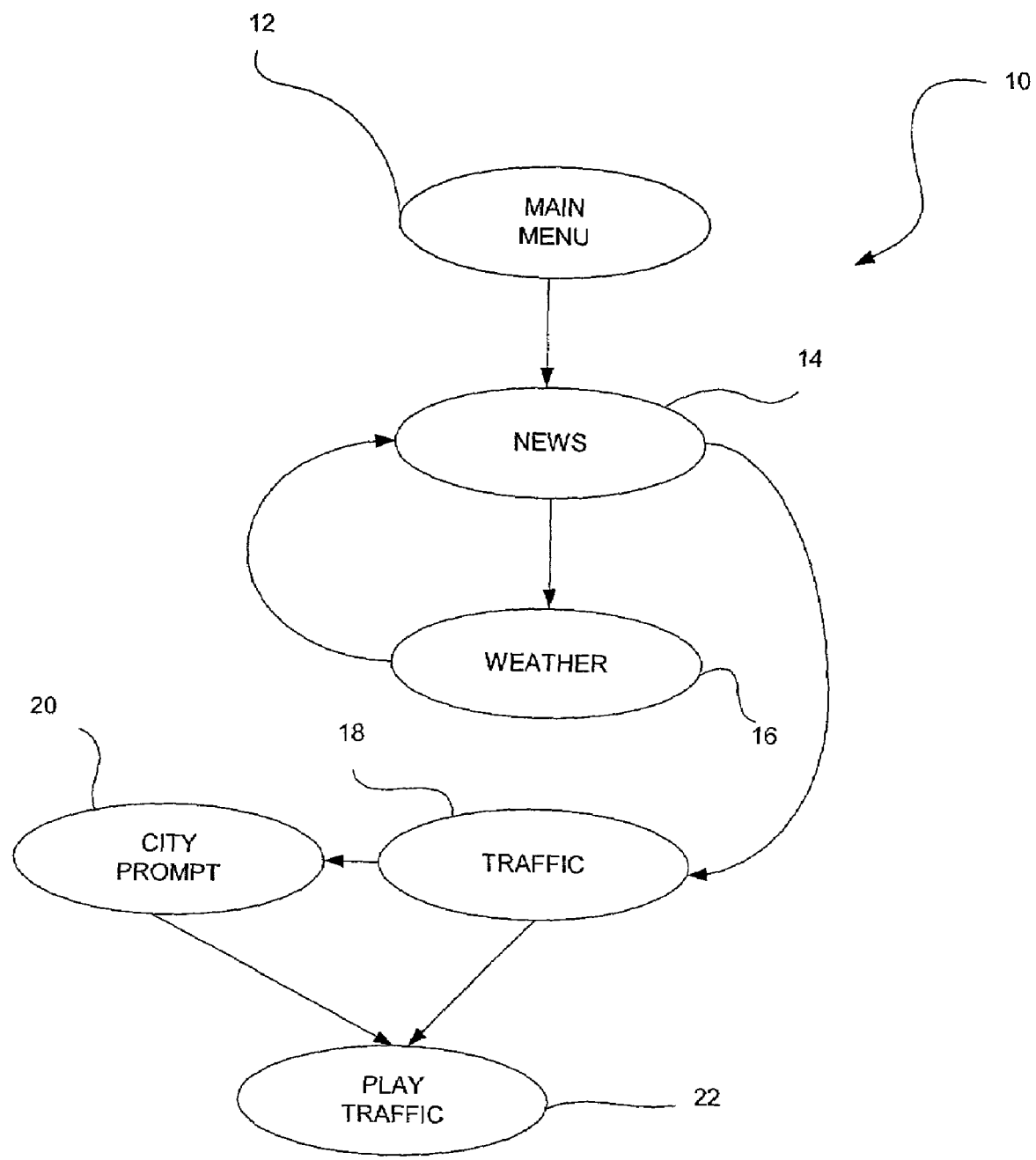
FIG. 1 illustrates a particular example of use of a conventional voice browser showing the manner in which a user may transition among states.
Figure 1A:
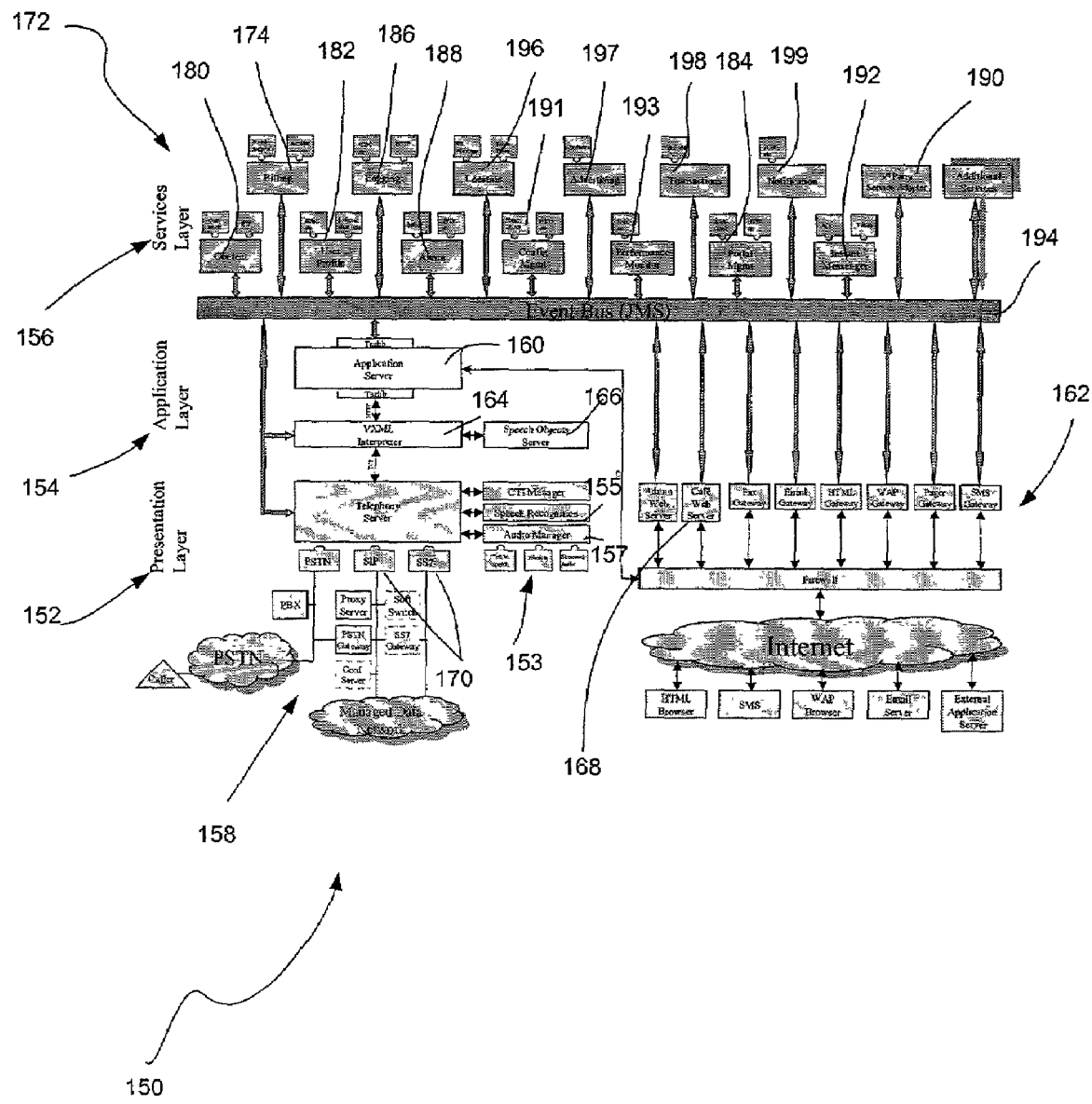
FIG. 1A illustrates an exemplary environment in which the present invention may be implemented.

FIG. 1A illustrates one exemplary platform 150 on which the present invention may be implemented. The present platform 150 is capable of supporting voice applications that provide unique business services. Such voice applications may be adapted for consumer services or internal applications for employee productivity.

The present platform of FIG. 1A provides an end-to-end solution that manages a presentation layer 152, application logic 154, information access services 156, and telecom infrastructure 159. With the instant platform, customers can build complex voice applications through a suite of customized applications and a rich development tool set on an application server 160. The present platform 150 is capable of deploying applications in a reliable, scalable manner, and maintaining the entire system through monitoring tools.

The present platform 150 is multi-modal in that it facilitates information delivery via multiple mechanisms 162, i.e. Voice, Wireless Application Protocol (WAP), Hypertext Mark-up Language (HTML), Facsimile, Electronic Mail, Pager, and Short Message Service (SMS). It further includes a VoiceXML interpreter 164 that is fully compliant with the VoiceXML 1.0 specification, written entirely in Java®, and supports Nuance® SpeechObjects 166.

Yet another feature of the present platform 150 is its modular architecture, enabling "plug-and-play" capabilities. Still yet, the instant platform 150 is extensible in that developers can create their own custom services to extend the platform 150. For further versatility, Java® based components are supported that enable rapid development, reliability, and portability. Another web server 168 supports a web-based development environment that provides a comprehensive set of tools and resources which developers may need to create their own innovative speech applications.

Support for SIP and SS7 (Signaling System 7) is also provided. Backend Services 172 are also included that provide value added functionality such as content management 180 and user profile management 182. Still yet, there is support for external billing engines 174 and integration of leading edge technologies from Nuance®, Oracle®, Cisco®, Natural Microsystems®, and Sun Microsystems®.

More information will now be set forth regarding the application layer 154, presentation layer 152, and services layer 156.

Application Layer (154)

The application layer 154 provides a set of reusable application components as well as the software engine for their execution. Through this layer, applications benefit from a reliable, scalable, and high performing operating environment. The application server 160 automatically handles lower level details such as system management, communications, monitoring, scheduling, logging, and load balancing. Some optional features associated with each of the various components of the application layer 154 will now be set forth.

Application Server (160)
 A high performance web/JSP server that hosts the business and presentation logic of applications.
 High performance, load balanced, with failover.
 Contains reusable application components and ready to use applications.
 Hosts Java Servlets and JSP's for custom applications.
 Provides easy to use taglib access to platform services.

VoiceXML Interpreter (164)
 Executes VoiceXML applications
 VoiceXML 1.0 compliant
 Can execute applications hosted on either side of the firewall.
 Extensions for easy access to system services such as billing.
 Extensible—allows installation of custom VoiceXML tag libraries and speech objects.
 Provides access to SpeechObjects 166 from VoiceXML.
 Integrated with debugging and monitoring tools.
 Written in Java®.

Speech Objects Server (166)
 Hosts SpeechObjects based components.
 Provides a platform for running SpeechObjects based applications.
 Contains a rich library of reusable SpeechObjects.

Services Layer (156)

The services layer 156 simplifies the development of voice applications by providing access to modular value-added services. These backend modules deliver a complete set of functionality, and handle low level processing such as error checking. Examples of services include the content 180, user profile 182, billing 174, and portal management 184 services. By this design, developers can create high performing, enterprise applications without complex programming. Some optional features associated with each of the various components of the services layer 156 will now be set forth.

Content (180)
 Manages content feeds and databases such as weather reports, stock quotes, and sports.
 Ensures content is received and processed appropriately.
 Provides content only upon authenticated request.
 Communicates with logging service 186 to track content usage for auditing purposes.
 Supports multiple, redundant content feeds with automatic failover.
 Sends alarms through alarm service 188.

User Profile (182)
 Manages user database
 Can connect to a $3^{rd}$ party user database 190. For example, if a customer wants to leverage his/her own user database, this service may manage the connection to the external user database.
 Provides user information upon authenticated request.

Alarm (188)
 Provides a simple, uniform way for system components to report a wide variety of alarms.

Allows for notification (Simply Network Management Protocol (SNMP), telephone, electronic mail, pager, facsimile, SMS, WAP push, etc.) based on alarm conditions.

Allows for alarm management (assignment, status tracking, etc) and integration with trouble ticketing and/or helpdesk systems.

Allows for integration of alarms into customer premise environments.

Configuration Management (191)

Maintains the configuration of the entire system.

Performance Monitor (193)

Provides real time monitoring of entire system such as number of simultaneous users per customer, number of users in a given application, and the uptime of the system.

Enables customers to determine performance of system at any instance.

Portal Management (184)

The portal management service 184 maintains information on the configuration of each voice portal and enables customers to electronically administer their voice portal through the administration web site.

Portals can be highly customized by choosing from multiple applications and voices. For example, a customer can configure different packages of applications i.e. a basic package consisting of 3 applications for $4.95, a deluxe package consisting of 10 applications for $9.95, and premium package consisting of any 20 applications for $14.95.

Instant Messenger (192)

Detects when users are "on-line" and can pass messages such as new voicemails and e-mails to these users.

Billing (174)

Provides billing infrastructure such as capturing and processing billable events, rating, and interfaces to external billing systems.

Logging (186)

Logs all events sent over the JMS bus 194. Examples include User A of Company ABC accessed Stock Quotes, application server 160 requested driving directions from content service 180, etc.

Location (196)

Provides geographic location of caller.

Location service sends a request to the wireless carrier or to a location network service provider such as TimesThree® or US Wireless. The network provider responds with the geographic location (accurate within 75 meters) of the cell phone caller.

Advertising (197)

Administers the insertion of advertisements within each call. The advertising service can deliver targeted ads based on user profile information.

Interfaces to external advertising services such as Wyndwire® are provided.

Transactions (198)

Provides transaction infrastructure such as shopping cart, tax and shipping calculations, and interfaces to external payment systems.

Notification (199)

Provides external and internal notifications based on a timer or on external events such as stock price movements. For example, a user can request that he/she receive a telephone call every day at 8AM.

Services can request that they receive a notification to perform an action at a pre-determined time. For example, the content service 180 can request that it receive an instruction every night to archive old content.

$3^{rd}$ Party Service Adapter (190)

Enables $3^{rd}$ parties to develop and use their own external services. For instance, if a customer wants to leverage a proprietary system, the $3^{rd}$ party service adapter can enable it as a service that is available to applications.

Presentation Layer (152)

The presentation layer 152 provides the mechanism for communicating with the end user. While the application layer 154 manages the application logic, the presentation layer 152 translates the core logic into a medium that a user's device can understand. Thus, the presentation layer 152 enables multi-modal support. For instance, end users can interact with the platform through a telephone, WAP session, HTML session, pager, SMS, facsimile, and electronic mail. Furthermore, as new "touchpoints" emerge, additional modules can seamlessly be integrated into the presentation layer 152 to support them.

Telephony Server (158)

The telephony server 158 provides the interface between the telephony world, both Voice over Internet Protocol (VoIP) and Public Switched Telephone Network (PSTN), and the applications running on the platform. It also provides the interface to speech recognition and synthesis engines 153. Through the telephony server 158, one can interface to other $3^{rd}$ party application servers 190 such as unified messaging and conferencing server. The telephony server 158 connects to the telephony switches and "handles" the phone call.

Features of the Telephony Server 158 Include:
Mission critical reliability.
Suite of operations and maintenance tools.
Telephony connectivity via ISDN/T1/E1, SIP and SS7 protocols.
DSP-based telephony boards offload the host, providing real-time echo cancellation, DTMF & call progress detection, and audio compression/decompression.

Speech Recognition Server (155)

The speech recognition server 155 performs speech recognition on real time voice streams from the telephony server 158. The speech recognition server 155 may support the following features:
Carrier grade scalability & reliability
Large vocabulary size
Industry leading speaker independent recognition accuracy
Recognition enhancements for wireless and hands free callers
Dynamic grammar support—grammars can be added during run time.
Multi-language support
Barge in—enables users to interrupt voice applications. For example, if a user hears "Please say a name of a football team that you," the user can interject by saying "Miami Dolphins" before the system finishes.
Speech objects provide easy to use reusable components
"On the fly" grammar updates
Speaker verification Audio Manager (157)
  Manages the prompt server, text-to-speech server, and streaming audio.

Prompt Server (153)
  The Prompt server is responsible for caching and managing pre-recorded audio files for a pool of telephony servers.

Text-to-Speech Server (153)
  When pre-recorded prompts are unavailable, the text-to-speech server is responsible for transforming text input into audio output that can be streamed to callers on the telephony server 158. The use of the TTS server offloads the telephony server 158 and allows pools of TTS resources to be shared across several telephony servers. Features include:
  Support for industry leading technologies such as SpeechWorks® Speechify® and L&H RealSpeak®.
  Standard Application Program Interface (API) for integration of other TTS engines.

Streaming Audio
  The streaming audio server enables static and dynamic audio files to be played to the caller. For instance, a one minute audio news feed would be handled by the streaming audio server.
  Support for standard static file formats such as WAV and MP3
  Support for streaming (dynamic) file formats such as Real Audio® and Windows® Media®.

PSTN Connectivity
  Support for standard telephony protocols like ISDN, E&M WinkStart®, and various flavors of E1 allow the telephony server 158 to connect to a PBX or local central office.

SIP Connectivity
  The platform supports telephony signaling via the Session Initiation Protocol (SIP). The SIP signaling is independent of the audio stream, which is typically provided as a G.711 RTP stream. The use of a SIP enabled network can be used to provide many powerful features including:
  Flexible call routing
  Call forwarding
  Blind & supervised transfers
  Location/presence services
  Interoperable with SIP compliant devices such as soft switches
  Direct connectivity to SIP enabled carriers and networks
  Connection to SS7 and standard telephony networks (via gateways)

Admin Web Server
  Serves as the primary interface for customers.
  Enables portal management services and provides billing and simple reporting information. It also permits customers to enter problem ticket orders, modify application content such as advertisements, and perform other value added functions.
  Consists of a website with backend logic tied to the services and application layers. Access to the site is limited to those with a valid user id and password and to those coming from a registered IP address. Once logged in, customers are presented with a homepage that provides access to all available customer resources.

Other (168)
  Web-based development environment that provides all the tools and resources developers need to create their own speech applications.

Provides a VoiceXML Interpreter that is:
  Compliant with the VoiceXML 1.0 specification.
  Compatible with compelling, location-relevant SpeechObjects—including grammars for nationwide US street addresses.
  Provides unique tools that are critical to speech application development such as a vocal player. The vocal player addresses usability testing by giving developers convenient access to audio files of real user interactions with their speech applications. This provides an invaluable feedback loop for improving dialogue design.

WAP, HTML, SMS, Email, Pager, and Fax Gateways
  Provide access to external browsing devices.
  Manage (establish, maintain, and terminate) connections to external browsing and output devices.
  Encapsulate the details of communicating with external device.
  Support both input and output on media where appropriate. For instance, both input from and output to WAP devices.
  Reliably deliver content and notifications.

Figure 2:
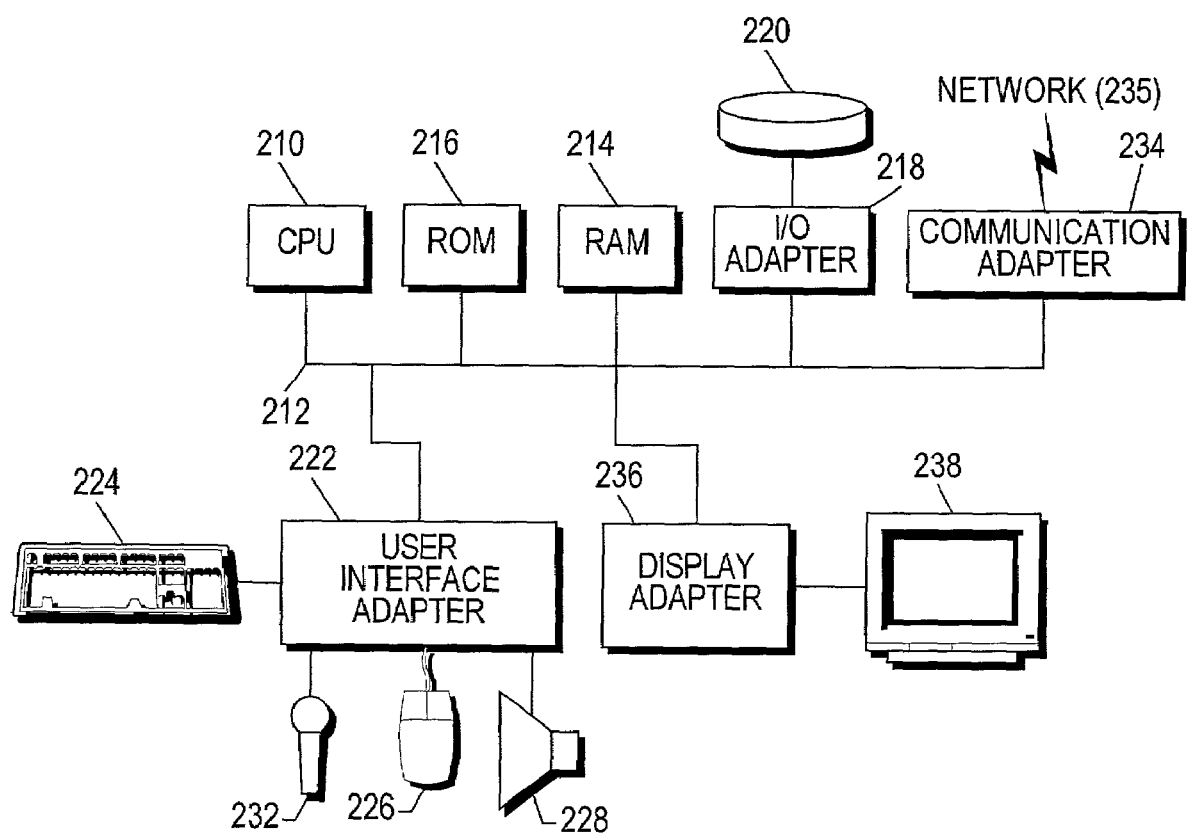
FIG. 2 shows a representative hardware environment associated with the various components of FIG. 1A.

FIG. 2 shows a representative hardware environment associated with the various systems, i.e. computers, servers, etc., of FIG. 1A. FIG. 2 illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

Figure 3:
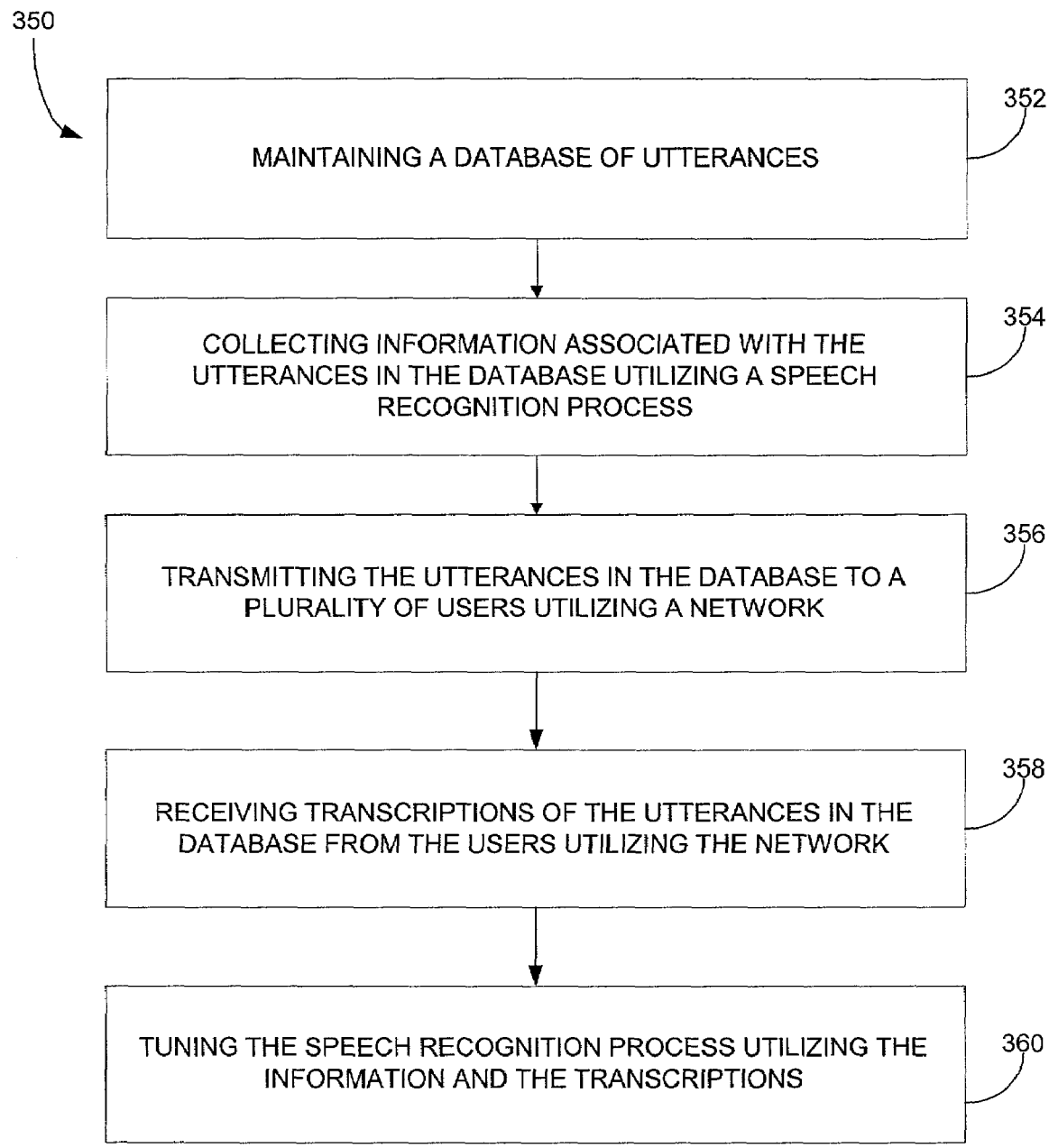
FIG. 3 illustrates a method for providing a speech recognition process utilizing the utterances collected during the method of FIG. 3.

FIG. 3 illustrates a method 350 for providing a speech recognition process utilizing the utterances collected during use of a voice portal. Initially, a database of the collected utterances is maintained. See operation 352. In operation 354, information associated with the utterances is collected utilizing a speech recognition process. When a speech recognition process application is deployed, audio data and recognition logs may be created. Such data and logs may also be created by simply parsing through the database at any desired time.

In one embodiment, a database record may be created for each utterance. Table 1 illustrates the various information that the record may include.

TABLE 1

Name of the grammar it was recognized against;
Name of the audio file on disk;
Directory path to that audio file;
Size of the file (which in turn can be used to calculate the length of the utterance if the sampling rate is fixed);
Session identifier;
Index of the utterance (i.e. the number of utterances said before in the same session);
Dialog state (identifier indicating context in the dialog flow in which recognition happened);
Recognition status (i.e. what the recognizer did with the utterance (rejected, recognized, recognizer was too slow);
Recognition confidence associated with the recognition result;
Recognition hypothesis;
Gender of the speaker;
Identification of the transcriber; and/or
Date the utterances were transcribed.

Inserting utterances and associated information in this fashion in the database (SQL database) allows instant visibility into the data collected. Table 2 illustrates the variety of information that may be obtained through simple queries.

TABLE 2

Number of collected utterances;
Percentage of rejected utterances for a given grammar;
Average length of an utterance;
Call volume in a give data range;
Popularity of a given grammar or dialog state; and/or
Transcription management (i.e. transcriber's productivity).

Further, in operation 356, the utterances in the database are transmitted to a plurality of users utilizing a network. As such, transcriptions of the utterances in the database may be received from the users utilizing the network. Note operation 358. As an option, the transcriptions of the utterances may be received from the users using a network browser.

Figure 4:
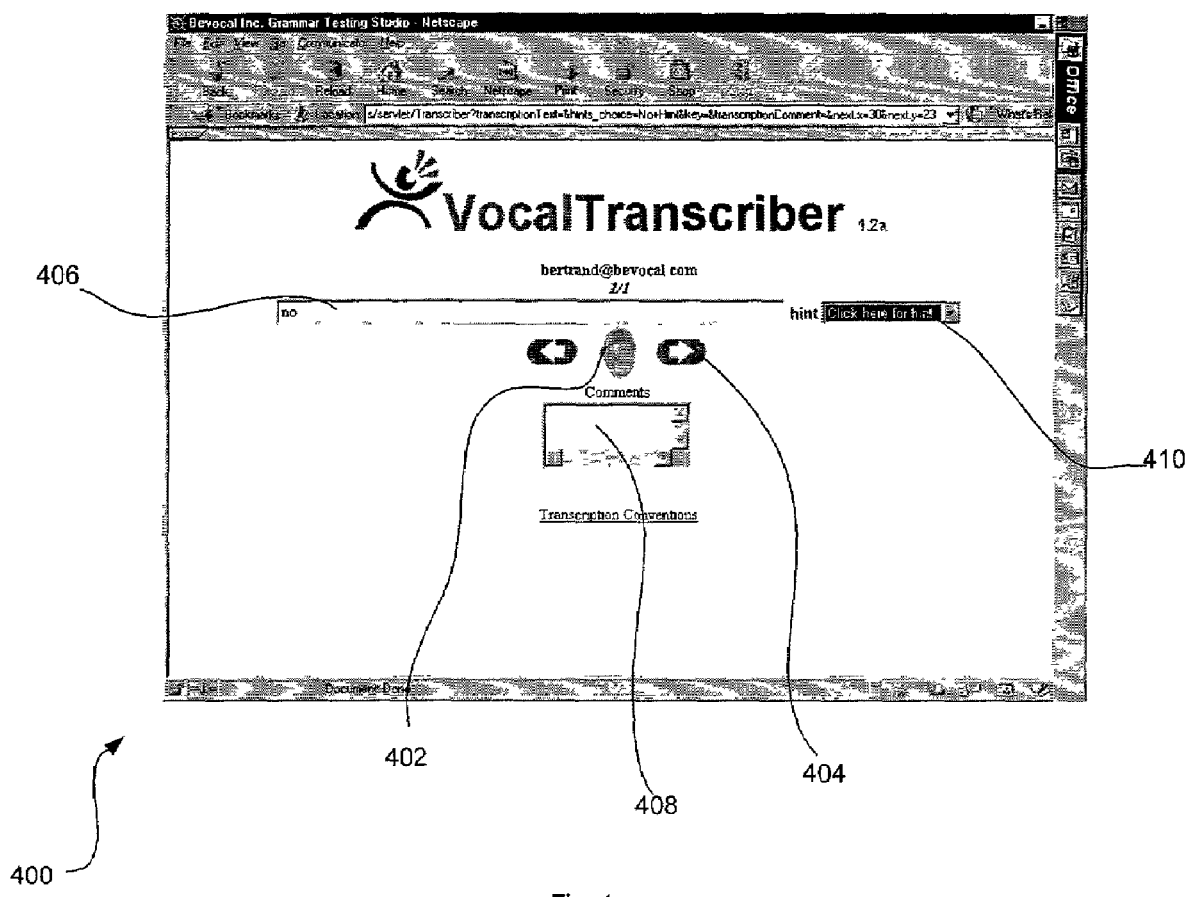
FIG. 4 illustrates a web-based interface which interacts with a database to enable and coordinate an audio transcription effort.

FIG. 4 illustrates a web-based interface 400 that may be used which interacts with the database to enable and coordinate the audio transcription effort. As shown, a speaker icon 402 is adapted for emitting a present utterance upon the selection thereof. Previous and next utterances may be queued up using selection icons 404. Upon the utterance being emitted, a local or remote user may enter a string corresponding to the utterance in a string field 406. Further, comments (re. transcriber's performance) may be entered regarding the transcription using a comment field 408. Such comments may be stored for facilitating the tuning effort, as will soon become apparent.

As an option, the web-based interface 400 may include a hint pull down menu 410. Such hint pull down menu 410 allows a user choose from a plurality of strings identified by the speech recognition process. This allows the transcriber to do a manual comparison between the utterance and the results of the speech recognition process. Comments regarding this analysis may also be entered in the comment field 408.

The web-based interface 400 thus allows anyone with a web-browser and a network connection to contribute to the tuning effort. During use, the interface 400 is capable of playing collected sound files to the authenticated user, and allows them to type into the browser what they hear. Making the transcription task remote simplifies the task of obtaining quality transcriptions of location specific audio data (street names, city names, landmarks). The order in which the utterances are fed to the transcribers can be tweaked by a transcription administrator (e.g. to favor certain grammars, or more recently collected utterances). This allows for the transcribers work to be focuse on the areas needed.

Similar to the speech recognition process of operation 304 of FIG. 3, the present interface 400 of FIG. 4 and the transcription process contribute information for use during subsequent tuning. Table 3 illustrates various fields of information that may be associated with each utterance record in the database.

TABLE 3

Date the utterance was transcribed;
Identifier of the transcriber;
Transcription text;
Transcription comments noting speech anomalies;
and/or
Gender identifier.

During operation, the database of utterances collected and maintained during the methods of FIG. 3 may be used to provide various services. Examples of various specific voice portal applications are set forth in Table 4. It should be noted that any services may be afforded per the desires of the user.

TABLE 4

Figure 5:
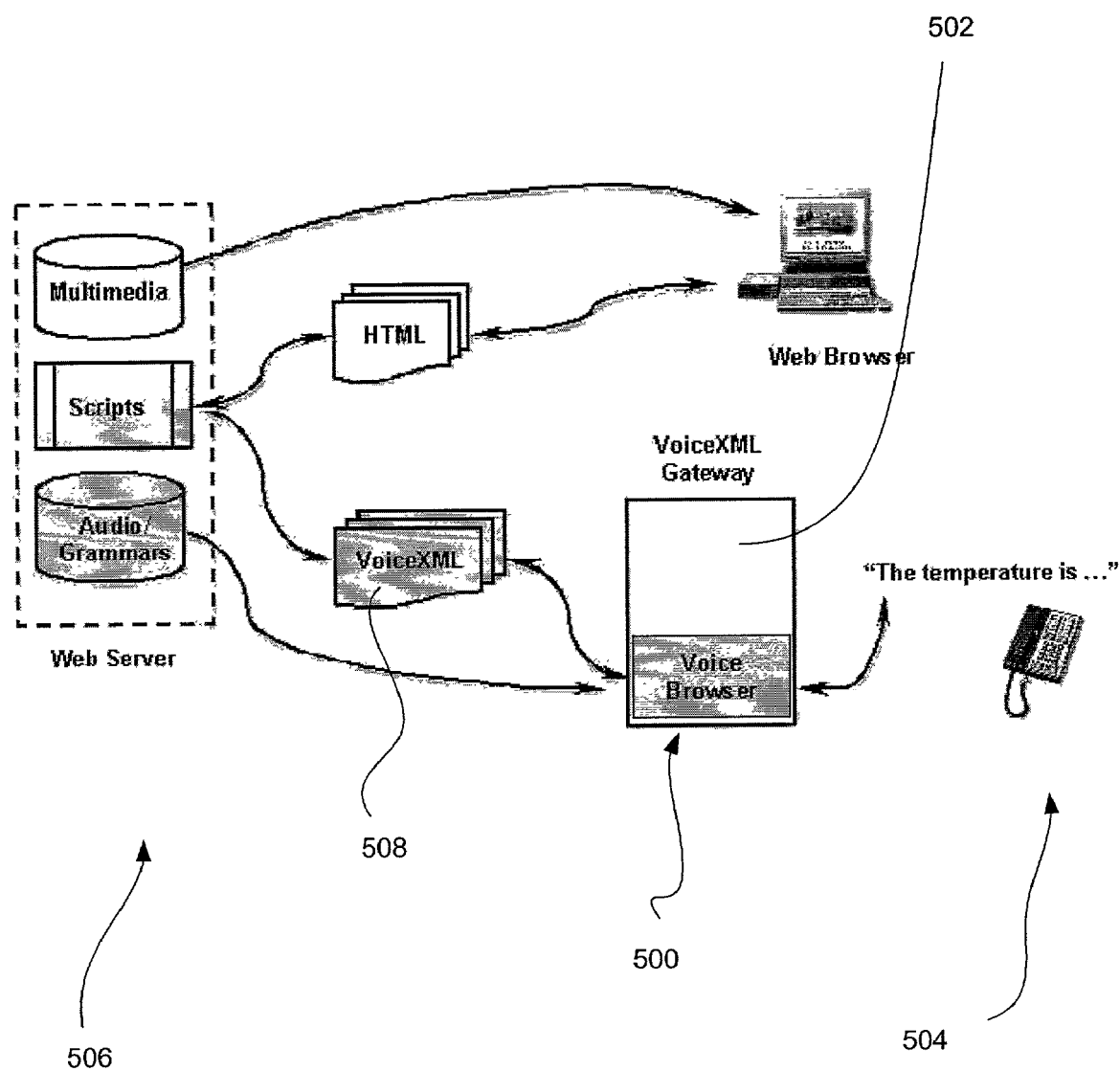
FIG. 5 is a schematic illustrating the manner in which VoiceXML functions, in accordance with one embodiment of the present invention.

Nationwide Business Finder—search engine for locating businesses representing popular brands demanded by mobile consumers.
Nationwide Driving Directions—point-to-point driving directions
Worldwide Flight Information—up-to-the-minute flight information on major domestic and international carriers
Nationwide Traffic Updates—real-time traffic information for metropolitan areas
Worldwide Weather—updates and extended forecasts throughout the world
News—audio feeds providing the latest national and world headlines, as well as regular updates for business, technology, finance, sports, health and entertainment news
Sports—up-to-the-minute scores and highlights from the NFL, Major League Baseball, NHL, NBA, college football, basketball, hockey, tennis, auto racing, golf, soccer and boxing
Stock Quotes—access to major indices and all stocks on the NYSE, NASDAQ, and AMEX exchanges
Infotainment—updates on soap operas, television dramas, lottery numbers and horoscopes FIG. 5 is a schematic illustrating the manner in which VoiceXML functions in the context of the aforementioned architecture to support a voice portal that provides services such as those of Table 4. As shown, a typical VoiceXML interpreter 500 runs on a specialized voice gateway node 502 that is connected both to the public switched telephone network 504 and to the Internet 506. As shown, VoiceXML 508 acts as an interface between the voice gateway node 502 and the Internet 506.

VoiceXML takes advantage of several trends:

The growth of the World-Wide Web and of its capabilities.

Improvements in computer-based speech recognition and text-to-speech synthesis.

The spread of the WWW beyond the desktop computer.

Voice application development is easier because VoiceXML is a high-level, domain-specific markup language, and because voice applications can now be constructed with plentiful, inexpensive, and powerful web application development tools.

VoiceXML is based on XML. XML is a general and highly flexible representation of any type of data, and various transformation technologies make it easy to map one XML structure to another, or to map XML into other data formats.

VoiceXML is an extensible markup language (XML) for the creation of automated speech recognition (ASR) and interactive voice response (IVR) applications. Based on the XML tag/attribute format, the VoiceXML syntax involves enclosing instructions (items) within a tag structure in the following manner:

<element_name attribute_name="attribute_value">

. . . contained items . . .

</element_name>

A VoiceXML application consists of one or more text files called documents. These document files are denoted by a ".vxml" file extension and contain the various VoiceXML instructions for the application. It is recommended that the first instruction in any document to be seen by the interpreter be the XML version tag:

<?xml version="1.0"?>

The remainder of the document's instructions should be enclosed by the vxml tag with the version attribute set equal to the version of VoiceXML being used ("1.0" in the present case) as follows:

<vxml version="1.0">

Inside of the <vxml> tag, a document is broken up into discrete dialog elements.

Each element has a name and is responsible for executing some portion of the dialog. An element is denoted by the use of the <element> tag. Table 5 illustrates an exemplary list of element types available in one specification of VoiceXML.

Figure 6:
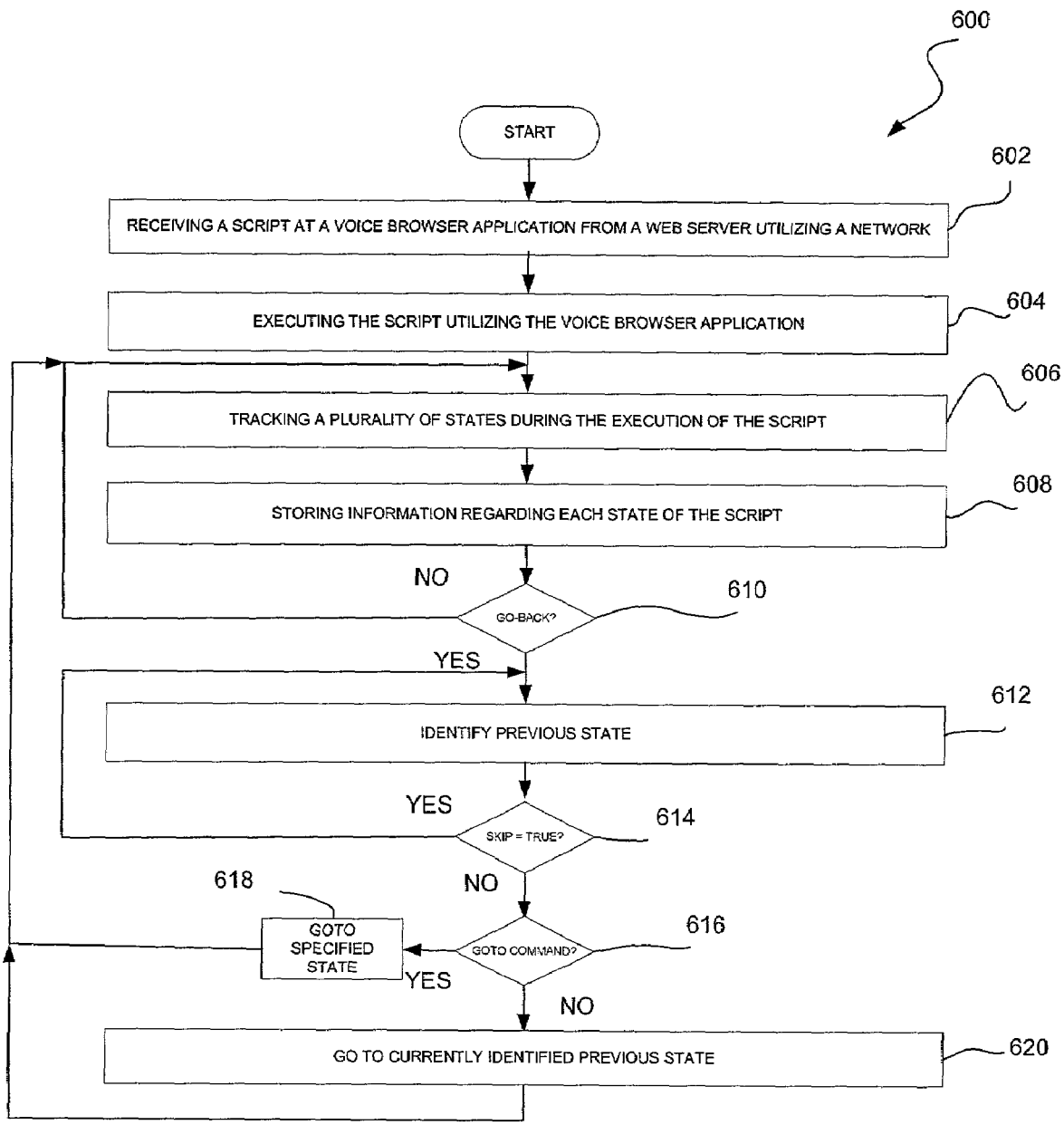
FIG. 6 illustrates a method for transitioning among states during use of a voice browser, in accordance with one embodiment.

TABLE 5 element types:
<field> - gathers input from the user via speech or DTMF recognition as defined by a grammar
<record> - records an audio clip from the user
<transfer> - transfers the user to another phone number
<object> - invokes a platform-specific object that may gather user input, returning the result as an ECMAScript object <subdialog>—performs a call to another dialog or document(similar to a function call), returning the result as an ECMAScript object FIG. 6 illustrates a method 600 for transitioning among states during use of a voice browser, in accordance with one embodiment. As an option, the present method 600 may be carried out in the context of the browser 500 of FIG. 5 and the architecture of FIG. 1A. It should be noted, however, that any type of architecture may be utilized per the desires of the user.

In use during operation 602, a script is initially received at the voice browser from a web server utilizing a network. The script may refer to any type of application capable of being handled by the voice browser. Next, in operation 604, the script is executed utilizing the voice browser.

As mentioned earlier, a script run using a voice browser may include a plurality of states each representing a particular point in the sequence of functionality carried out by the script. Such states are tracked during the execution of the script in operation 606. In particular, the voice browser continuously tracks information at each state of the script.

Moreover, information is stored regarding each state of the script. Note operation 608. Optionally, such information may be stored in the form of a stack. Further, the information may identify a type of event associated with one of the states, a field item (i.e. subdialog, transfer item, object item, etc.), a form, and an application. As an option, a pointer may be stored to point to a location of the foregoing information. In particular, in the case of field items, such pointer may be used to point to the location of a value of the item or the item itself. More detail regarding such will be set forth hereinafter.

Operations 606 and 608 are continued until a "go-back" request is received from the user. Upon receiving such a request from a user during the execution of the script to transition to a previous state in decision 610, the voice browser automatically transitions to the previous state of the script. More information will now be set forth on how this accomplished utilizing the aforementioned stack of information.

When the user provides requested input, an interpreter of the script saves information about a go-back destination as an entry on a "go-back stack." Each request for user input may be referred to as a state in the form of a "go-back destination."

If the user says "go-back," the interpreter automatically uses the saved information for the most recent go-back destination on the stack to undo the actions that resulted from the user's response. The interpreter then transitions back to that go-back destination, popping the corresponding entry off the stack.

Each entry on the go-back stack saves information about one step that the interpreter performed during the execution of the script. The entries corresponding to go-back destinations may be referred to as go-back entries; they correspond to the user-visible steps in the interaction. As the user retraces these steps, the interpreter goes back to the appropriate elements within the VoiceXML script, transparently moving between dialogs and documents as necessary.

For example, after the user fills the last field in a form, the form may transition to a different form in a different document. If the user says "go-back" to the first question on the new form, the interpreter returns to the first form in the original document. It clears the last field in that form, but restores the values of all other form item variables in the form. A user's response may match a link grammar that transitions to a different form or that throws an event that causes a transition. Further, a user's response may match a document-scoped grammar in a different form, causing a transition to that form. If the user says "go-back" to the first question in the new location, the interpreter returns to the form and field that was being visited at the time of the user's last response.

In addition to the go-back entries, the go-back stack may save internal entries, which correspond to non-user-visible steps, such as transitions between forms. When the interpreter goes back to the most recent go-back destination, it also "undoes" each non-user-visible step that occurred after the last go-back destination and pops the corresponding internal entry off the stack.

A <block> form item does not request user input and so is not a possible go-back destination. However, any block items that are executed between one input request and the next are saved as internal stack entries that can be undone when the interpreter goes back to the preceding input request.

The stack may vary in size. The interpreter keeps at least a minimum number entries on the stack, except at the beginning of the call when fewer steps have been executed, and after the user has said "go-back" so many consecutive times that the stack has been depleted. By default, this property is set to 0, which means that the go-back stack is always empty and the go-back facility is effectively disabled.

Table 6 illustrates an example script that sets the minimum stack size to 20 entries.

TABLE 6

```
<?xml version="1.0" ?>
<!DOCTYPE vxml PUBLIC "-//BeVocal Inc//VoiceXML
1.0//EN"
"http://cafe.bevocal.com/libraries/dtd/vxml1-0-
bevocal.dtd">
<vxml version="1.0">
    <!-- Save at least 20 entries on the go-back stack -->
    <property name="bevocal.mingoback" value="20"/>
    <form>
        <field name="home" type="phone">
            <prompt>
                What is your home phone number?
            </prompt>
        </field>
        <field name="work" type="phone">
            <prompt>
                What is your work phone number?
            </prompt>
        </field>
    </form>
</vxml>
```

A VoiceXML application can request user input in a menu, in the initial item of a mixed-initiative form, and in a field item. These elements, therefore, can be go-back destinations.

A <menu> element asks the user to select a choice. The <menu> element is the go-back destination for the user's response. If the user says "go-back" after selecting a menu choice, the menu is executed again.

The <initial> element of a mixed-initiative form asks the user for initial input to the form. This element is the go-back destination for the user's response. If the user says "go-back" after providing initial input, the initial element is executed again. The user's answer to the initial prompt may provide values for several of the form's field item variables. When the interpreter "undoes" an initial element, it clears not only the initial form item variable, but also any field item variables that were set by the user's response.

Table 7 illustrates the manner in which field items can be classified for the purposes of the go-back facility.

TABLE 7

The <field> and <record> items accept a single user input. These field items appear to the user as a single request for information.
The <transfer> item may involve a long interaction between the user and a third party. It provides the application with a single piece of information, namely the result of the transfer. During a transfer, however, the user may provide various pieces of information to the third party and may later want to retract some or all of that information.
The <object> and <subdialog> items may accept multiple user inputs and so they may appear to the user as multiple requests for information.

More information on the above items will now be set forth.

A <field> item asks the user for the value of its field item variable. A <record> item asks the user for input to be recorded. These field items are go-back destinations. If the interpreter goes back to one of these items, it clears the corresponding field item variable and executes the item again. Going back to a <field> item allows the user to give a different answer; going back to a <record> item allows the user to provide different input to be recorded.

A <transfer> item transfers the user to another destination, allowing the user to carry on a conversation with a third party. At the end of a bridging transfer, the interpreter resumes execution of the form containing the transfer item. The user might then say "go-back" to the next request for input. In a blind transfer, the current session terminates when the transfer is made; the user may have no opportunity to invoke the go-back facility at the end of the call.

A transfer item is a go-back destination. If the interpreter goes back to a transfer item, the transfer call is repeated. Any change in the information exchanged during the original transfer and during the repeated transfer is determined by the user's conversation with the third party and does not affect the VoiceXML application. For example, the original transfer might place a call in which the user orders a pizza. After that call, the user might say "go-back," and add a salad to the original order.

An <object> item invokes a reusable speech object component. This component may make one or more requests for information from the user. The information supplied by the user (and other information) may be returned to the application in properties of the field-item variable. An object item is a go-back destination; however, the individual requests for input made during the execution of the object are not necessarily go-back destinations.

Go-back behavior during the execution of the object is determined entirely by the object implementation. The object might ignore a "go-back" request completely. Alternatively, the object might implement its own go-back facility, allowing the user to retract answers to questions asked by the object.

Once control returns from the object to the VoiceXML interpreter, all the object's internal state is lost. If the user says "go-back" to the next question after executing the object, the object is executed again.

If an object requests a single user input, the go-back behavior is the same as for any other single-input field item. If an object requests more than one user input, however, the go-back behavior may not be what the user expects. Table 8 illustrates a plurality of field items that may exist in a form.

TABLE 8

```
<field name="A">...</field>
<object name="B" ...>
    ...
    <!-- Object asks questions C, D, and E -->
</object>
<field name="F">...</field>
```

A user who says "go-back" when prompted for field F, might expect to provide a different answer to question E. However, the interpreter goes back to object B. It executes the object from the beginning, asking questions C, D, and E again.

A <subdialog> item invokes another dialog as a subdialog of the current one. Each request for input made by the subdialog is a go-back destination. The <subdialog> element itself is also a go-back destination.

If the user says "go-back" to a request for input inside the subdialog, the go-back behavior is the same as in any other form. Within the subdialog's execution context, the go-back stack is initially identical to the go-back stack in the calling dialog's execution context. As each new input is requested, another go-back destination is pushed onto the stack. If the user says "go-back" to the first input request in the subdialog, the interpreter returns to the last go-back destination in the calling dialog. If the user says "go-back" to a subsequent input request in the subdialog, the interpreter returns to the preceding go-back destination in the subdialog Once the subdialog returns to the calling dialog, however, the subdialog's execution context terminates. The go-back stack in the calling dialog's execution context does not contain any go-back destinations for the input requests made by the subdialog. A new go-back destination is added for the subdialog itself.

If the subdialog requests a single user input, the go-back behavior is the same as for any other single-input field item. If a subdialog requests more than one user input, however, the go-back behavior may not be what the user expects. For example, a document may contain the forms of Table 9.

TABLE 9

```
<form id="main">
    <field name="A">...</field>
    <subdialog name="B" src="#sub">
        ...
    </subdialog>
    <field name="F">...</field>
</form>
<form id="sub">
    <field name="C">...</field>
    <field name="D">...</field>
    <field name="E">...</field>
    <filled>
        <return namelist="A B C"/>
    </filled>
</form>
```

A user who says "go-back" when prompted for field F might expect to provide a different answer for field E in the subdialog. However, the interpreter goes back to subdialog B. It executes the subdialog from the beginning, prompting again for fields C, D, and E.

In an alternate embodiment, one may be able to specify whether "go-back" may go-back into the subdialog (to ask for field E in the preceding example) or to the beginning of the subdialog.

The stack thus functions to allow the voice browser to automatically transition to the previous state of the script. The manner in which the voice browser determines to which state to transition will now be set forth.

With continuing reference to FIG. 6, the previous state is first identified in operation 612 upon receipt of the "go-back" request from the user. It is then determined whether code exists at the previous state indicating that the previous state should be skipped. Note decision 614. If so, the voice browser transitions to a state previous to the previous state in response to the request, and the process is repeated. Note the repeated instance of operation 612. As an option, the code may include a Boolean value associated with the script.

Thereafter, it is determined in decision 616 whether code exists indicating a state other than the previous state to which the script should be transitioned. If such code exists, the voice browser transitions to the state other than the previous state in response to the request. See operation 618. As an option, such code may include a function written in JAVA (i.e. JavaScript code). Moreover, the code may include a GOTO command. The fact that a <goto> (or <submit>, etc.) is included indicates that a state other than the previous one should be transitioned to.

In one embodiment, the way the decision 616 may work is that when the users says "go back", a goback VoiceXML event is thrown by the interpreter. This may occur at decision 610 in FIG. 6. A built-in handler of the interpreter for this event may exhibit the behavior shown in the diagram (except for decision 616, optionally). However, the VoiceXML application can provide a <catch> element that handles the goback event. If this is done, the code inside the <catch> is executed, and the default handler is not executed. The code in the <catch> can perform any action that is allowed in VoiceXML, including a <goto>, executing JavaScript, etc. In summary, the code may be adapted for identifying specific instructions relating to the manner in which the transitioning is to be carried out.

Thus, the go back mechanism may be integrated into the normal VoiceXML event handling mechanism, which makes it more powerful than it would be otherwise.

If no code is identified in decisions 614 or 616, the voice browser automatically transitions to the previous state of the script. Note operation 620. It should now be apparent that such transition is enabled by the information that is stored in the stack.

In other words, the present go-back facility may be controlled in various ways (i.e. skipping a previous state, utilizing a GOTO command, etc.). More information will now be set forth on such techniques of controlling the present go-back facility.

Table 10 illustrates a summary of the various ways one can control the use of the go-visible back facility.

TABLE 10

Prevent the user from retracting certain inputs.
Customize the application's response to a go-back request from the user.
Deactivate the go-back facility in the entire application, in a particular document, in a particular dialog, or in a particular go-back destination.

Suppressing Retraction

One can prevent the user from retracting certain inputs by setting a particular go-back property. This property controls whether requests for user input are legal go-back destinations. By default, the property is set to the Boolean value of "true" and each request for input is a legal go-back destination. When the user provides the requested input, the interpreter pushes a go-back entry for the request onto its go-back stack.

If the aforementioned property is "false", however, a request for input is a not a legal go-back destination. When the user provides the requested input, the interpreter pushes an internal entry for the request onto its go-back stack. The internal stack entry enables the interpreter to undo the information request if the user returns to an earlier go-back destination; however, it prevents the user from going back to the request itself.

A user's response is called "retractable" if a corresponding go-back entry is added to the stack; if, instead, an internal entry is added to the stack, the response cannot be retracted.

If one sets the go-back property to "false" in a field, the user's input for the field is not retractable. The user cannot go-back to that field, but may skip back to retract the preceding retractable input. If one sets this property to "false" in a form, one can prevent the user from retracting any input to that form.

When several fields are treated as a single conceptual unit, one may want to suppress retraction of all but the first field. For example, the go-back facility treats the city and state fields as a unit in the form of Table 11.

TABLE 11

```
<form>
    <field name="city">
        <prompt>Choose a city</prompt>
        <grammar>...</grammar>
    </field>
    <field name="state">
        <property name="bevocal.goback" value="false"/>
        <prompt>What state?</prompt>
        <grammar>...</grammar>
    </field>
    <field name="first" type="boolean">
        <prompt>
            Do you want to fly first class?
        </prompt>
    </field>
</form>
```

The user cannot retract an answer to the question about state, but can skip past it to retract the city. Note the dialog of Table 12.

TABLE 12

| | |
|---|---|
| Application: | Choose a city. |
| User: | Albany |
| Application: | What state? |
| User: | Georgia |
| Application: | Do you want to fly first class? |
| User: | Go-back. |
| Application: | Choose a city. |

Customizing Go-Back

When the speech-recognition engine matches the "goback" grammar, a "goback" event is thrown. The default handler undoes entries on the go-back stack until it reaches the most recent go-back entry, corresponding to the user's last retractable response. If the go-back stack is empty, the default handler plays an audio message that says "Sorry, you can't go-back" or similar language.

If one wants the application to take different actions, one can add his or her own event handler for go-back events. For example, an application might keep information about each user's default location. If the user requests a traffic report from the main menu, the traffic form might start to fetch the report for the user's default location without requesting the user's city. The application could use the go-back facility to allow the user to provide a different location. Note the form of Table 13.

TABLE 13

```
<form id="traffic">
    <catch event="goback">
        <clear/>
    </catch>
    <field name="city" expr="document.defaultCity">
        <prompt>What city?</prompt>
        <grammar>...</grammar>
    </field>
    <block>
        <prompt>
            Retrieving traffic data for
            <value name="city">
            Say Go-back to choose another city.
        </prompt>
        <!-- Retrieve and play traffic report -->
    </block>
</form>
```

Table 14 illustrates an exemplary interaction with the application.

TABLE 14

| | |
|---|---|
| Application: | Would you like news, weather, or traffic? |
| User: | Traffic |
| Application: | Retrieving traffic data for San Francisco. Say Go-back to choose another city. |
| User: | Go-back. |
| Application: | What city? |
| User: | San Jose. |
| Application: | Retrieving traffic data for San Francisco. Say Go-back to choose another city. |

In the foregoing case, saying "go-back" takes the user to a question that has never been asked before. If the application's go-back handler needs to take some actions and then proceed as normal to undo the user's response, it can perform the appropriate actions and then rethrow the event to the default handler. Note the code of Table 15.

TABLE 15

```
<catch event="goback">
    ...
    <rethrow/>
</catch>
```

Activating and Deactivating Go-Back

The universal "goback" grammar recognizes the spoken "go-back" request. In one embodiment, it is activated by default in a VoiceXML 1.0 application and deactivated by default in an application where the VoiceXML tag's version attribute equals 2.0.

As an option, one can set a "universals" property to activate or deactivate the "goback" grammar, either in the entire application, or in particular documents, forms, or fields. For example, the go-back facility is activated by default in the document of Table 16, but deactivated during the execution of a first form.

TABLE 16

```
<vxml version="1.0">
    <form>
        <!-- Activate only help and exit universals -->
        <property name="universals" value="help exit"/>
        ...
    </form>
    ...
</vxml>
```

When the go-back facility is deactivated, the speech-recognition engine does not recognize to the input "go-back." If the user says "go-back" to the prompt for a field, a no-match event is thrown. It should be noted that this behavior is different from the default behavior when the go-back property is set to "0." In that case, the "go-back" request is recognized. However, the go-back stack is empty, so the user hears the message, "Sorry, you can't go-back" or the like.

EXAMPLE

The present go-back facility allows the user to retract the last response to a VoiceXML application by saying "go-back." After the interpreter "removes" the user's response, it prompts for the information again. Table 17 illustrates an example of a script that may be used to illustrate the use of the present embodiment. In particular, the example of Table 17 includes a form that asks for the user's home and work phone numbers.

TABLE 17

```
<form>
    <field name="home" type="phone">
        <prompt>
            What is your home phone number?
        </prompt>
    </field>
    <field name="work" type="phone">
        <prompt>
            What is your work phone number?
        </prompt>
    </field>
</form>
```

In use, the user may inadvertently give the work number when asked for the home number. In such a scenario, the go-back facility would allow the user to correct this mistake. Table 18 illustrates the dialog enabled by the present go-back facility.

TABLE 18

| | |
|---|---|
| Application: | What is your home phone number? |
| User: | 408-555-3200. |
| Application: | What is your work phone number? |
| User: | Go-back. |
| Application: | What is your home phone number? |
| User: | 408-555-3042. |
| Application: | What is your work phone number? |
| User: | 408-555-3200. |

As shown, when user says "go-back," the interpreter undoes whatever actions resulted from the last response, then it prompts the user for a new response. The user can retract a sequence of responses by saying "go-back" repeatedly.

One may need to set the size of the go-back stack large enough to enable a user to retrace as many steps as are thought to be likely. The size of the stack limits the number of consecutive times the user can say "go-back." It should be noted that the stack should be large enough to accommodate internal entries as well as go-back entries. When one sets the stack size, one should allow for a few internal entries for each go-back entry.

Further, one can safely put blocks between go-back destinations in a form. For example, in the following form, if the user goes back to the home field, the interpreter "undoes" the subsequent block, clearing its item variable and allowing the block to be visited again after the user provides an new answer for the home field. Note Table 19.

TABLE 19

```
<form>
    <field name="home" type="phone">
        <prompt>
            What is your home phone number?
        </prompt>
    </field>
    <block>
        Your home number is <value expr="home"/>
    </block>
    <field name="work" type="phone">
        <prompt>
            What is your work phone number?
        </prompt>
    </field>
</form>
```

Table 20 illustrates how an exemplary interaction with the user might proceed.

TABLE 20

| | |
|---|---|
| Application: | What is your home phone number? |
| User: | 408-555-3200. |
| Application: | Your home number is 408-555-3200. |
| | What is your work phone number? |
| User: | Go-back. |
| Application: | What is your home phone number? |
| User: | 408-555-3042. |
| Application: | Your home number is 408-555-3042. |
| | What is your work phone number? |
| User: | 408-555-3200. |

A <block> in a form is saved as an internal stack entry only if it occurs after the first go-back destination in the form. If the form's first item is a block containing a welcoming prompt, no internal stack entry is saved for the block, so it will not be revisited if the go-back facility returns to first input request in the form.

In a mixed-initiative form, any welcoming prompt may optionally be put in the <initial> element, not in a separate <block> element.

The internal stack entry for a block is undone and redone only if the interpreter returns to a go-back destination before the block. As a consequence, a block that is used to prompt for information in the subsequent field is not redone if the interpreter goes back to the field. In the following form of Table 21, if the user says "go-back" when asked for a work phone number, the request for the home phone number would not be replayed.

TABLE 21

```
<form>
    <block>
        What is your home phone number?
    </block>
    <field name="home" type="phone">
    </field>
    <block>
        Your home number is <value expr="home"/>
    </block>
    <field name="work" type="phone">
        <prompt>
            What is your work phone number?
        </prompt>
    </field>
</form>
```

As an option, one may put the prompt for a field value inside the <field> element and not in a separate <block> element.

Further, to avoid any confusion that can occur if the user says "go-back" after returning from a subdialog, the use of subdialogs may be limited to requests for confirmation or disambiguation. In addition, one may prevent the subdialog itself from being a legal go-back destination by setting the go-back property to "false" inside the <subdialog> element. If the user says "go-back" after the subdialog returns, the interpreter may go-back to the question preceding the subdialog—presumably the question whose answer required confirmation or clarification.

When the interpreter returns to a particular go-back destination in a form, it clears form—item variables for every block, initial item, and field item that needs to be undone. However, it does not change the values of any other variables declared in dialog, document, or application scope. If the interpreter undoes a transition, going back to a different form, it does not restore the variables declared in the form to the values they had when that transition left the form.

If one uses the go-back facility, he or she should avoid saving state information in variables that cannot be reset by a go-back operation. In limited circumstances, one may be able to reset variables in an error handler for go-back events. In general, however, the event handler may not have enough context to know what variables need to be reset because the event is thrown at the location where the user says "go-back", not at the go-back destination.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for transitioning among states during use of a voice browser, comprising:
   (a) receiving a script at a voice browser utilizing a network;
   (b) executing the script utilizing the voice browser;
   (c) automatically tracking a plurality of states during the execution of the script utilizing the voice browser;
   (d) receiving a request from a user during the execution of the script to transition to a previous state;
   (e) automatically transitioning to the previous state of the script with the voice browser in response to the request;
   (f) determining whether code exists indicating a state other than the previous state to which the script should be transitioned in response to the request; and
   (g) transitioning to the state other than the previous state in response to the request if the code exists;
      wherein the code includes a command for identifying specific instructions relating to the transitioning;
      wherein the script includes customizable forms and fields;
      wherein the transitioning to the previous state is capable of being disabled according to at least one of an entire application, a document, a form and a field;
      wherein transitioning to the previous state retracts an input the user originally entered at the previous state;
      wherein a number of previous states a user is capable of transitioning to is customizable.

2. The method as set forth in claim 1, and further comprising determining whether code exists indicating that the previous state should be skipped.

3. The method as recited in claim 2, and further comprising transitioning to a state previous to the previous state.

4. The method as recited in claim 2, and further comprising transitioning to a state previous to the previous state in response to the request if the code exists.

5. The method as recited in claim 1, wherein the code includes a function written in JAVASCRIPT.

6. The method as set forth in claim 1, and further comprising storing information regarding each state of the script.

7. The method as set forth in claim 6, wherein the information identifies a type of event associated with one of the states.

8. The method as set forth in claim 6, wherein the information identifies an application.

9. The method as set forth in claim 6, wherein the information is accessed via a pointer.

10. A computer readable medium encoded with a computer program for transitioning among states during use of a voice browser, comprising:
   (a) computer code for receiving a script at a voice browser utilizing a network;
   (b) computer code for executing the script utilizing the voice browser;
   (c) computer code for automatically tracking a plurality of states during the execution of the script utilizing the voice browser;
   (d) computer code for receiving a request from a user during the execution of the script to transition to a previous state;
   (e) computer code for automatically transitioning to the previous state of the script with the voice browser in response to the request;
   (f) computer code for determining whether code exists indicating a state other than the previous state to which the script should be transitioned in response to the request; and
   (g) computer code for transitioning to the state other than the previous state in response to the request if the code exists;
      wherein the code includes a command for identifying specific instructions relating to the transitioning;
      wherein the script includes customizable forms and fields;
      wherein the transitioning to the previous state is capable of being disabled according to at least one of an entire application, a document, a form and a field;
      wherein transitioning to the previous state retracts an input the user originally entered at the previous state;
      wherein a number of previous states a user is capable of transitioning to is customizable.

11. A system for transitioning among states during use of a voice browser, comprising:
   (a) means for receiving a script at a voice browser utilizing a network;
   (b) means for executing the script utilizing the voice browser;
   (c) means for automatically tracking a plurality of states during the execution of the script utilizing the voice browser;
   (d) means for receiving a request from a user during the execution of the script to transition to a previous state;
   (e) means for automatically transitioning to the previous state of the script with the voice browser in response to the request;
   (f) means for determining whether code exists indicating a state other than the previous state to which the script should be transitioned in response to the request; and
   (g) means for transitioning to the state other than the previous state in response to the request if the code exists;
      wherein the code includes a command for identifying specific instructions relating to the transitioning;
      wherein the script includes customizable forms and fields;
      wherein the transitioning to the previous state is capable of being disabled according to at least one of an entire application, a document, a form and a field;
      wherein transitioning to the previous state retracts an input the user originally entered at the previous state;
      wherein a number of previous states a user is capable of transitioning to is customizable.

12. A system for transitioning among states during use of a voice browser, comprising:
  (a) logic for receiving a script at a voice browser utilizing a network;
  (b) logic for executing the script utilizing the voice browser;
  (c) logic for automatically tracking a plurality of states during the execution of the script utilizing the voice browser;
  (d) logic for receiving a request from a user during the execution of the script to transition to a previous state;
  (e) logic for automatically transitioning to the previous state of the script with the voice browser in response to the request;
  (f) logic for determining whether code exists indicating a state other than the previous state to which the script should be transitioned in response to the request; and
  (g) logic for transitioning to the state other than the previous state in response to the request if the code exists;
    wherein the code includes a command for identifying specific instructions relating to the transitioning;
    wherein the script includes customizable forms and fields;
    wherein the transitioning to the previous state is capable of being disabled according to at least one of an entire application, a document, a form and a field;
    wherein transitioning to the previous state retracts an input the user originally entered at the previous state;
    wherein a number of previous states a user is capable of transitioning to is customizable.

13. A method for transitioning among states during use of a voice browser, comprising:
  (a) receiving a script at a voice browser utilizing a network;
  (b) executing the script utilizing the voice browser;
  (c) tracking a plurality of states during the execution of the script;
  (d) storing information regarding each state of the script;
  (e) receiving a request from a user during the execution of the script to transition to a previous state;
  (f) if it is determined that code exists indicating that the previous state should be skipped, transitioning to a state previous to the previous state in response to the request utilizing the stored information;
  (g) if it is determined that code exists indicating a state other than the previous state to which the script should be transitioned, transitioning to the state other than the previous state in response to the request utilizing the stored information;
  (h) if said code does not exist, automatically transitioning to the previous state of the script with the voice browser in response to the request utilizing the stored information;
    wherein the code includes a command for identifying specific instructions relating to the transitioning;
    wherein the script includes customizable forms and fields;
    wherein the transitioning the previous state is capable of being disabled according to at least one of an entire application, a document, a form and a field;
    wherein the transitioning to the previous state retracts an input the user originally entered at the state;
    wherein a number of previous states a user is capable of transitioning to is customizable.

14. The method as set forth in claim 1, wherein the request includes a voice request that is associated with a preset grammar.

15. The method as set forth in claim 1, wherein an alert is sent to the user when the previous state is disabled.

16. The method as set forth in claim 1, wherein the user is prompted for new input at the previous state after transitioning to the previous state.

* * * * *